United States Patent [19]
Agano

[11] Patent Number: 5,973,712
[45] Date of Patent: Oct. 26, 1999

[54] IMAGE RECORDING APPARATUS

[75] Inventor: Toshitaka Agano, Kanagawa, Japan

[73] Assignee: Fuji Photo Film Co., Ltd., Kanagawa, Japan

[21] Appl. No.: 08/903,730

[22] Filed: Jul. 31, 1997

[30] Foreign Application Priority Data

Jul. 31, 1996 [JP] Japan ..................................... 8-202132

[51] Int. Cl.$^6$ .................................................. H04N 1/40
[52] U.S. Cl. .......................................................... 347/188
[58] Field of Search .................................... 347/188, 195, 347/194; 400/120.09, 120.15; 358/298, 455, 456, 461

[56] References Cited

U.S. PATENT DOCUMENTS

| | | | |
|---|---|---|---|
| 4,547,784 | 10/1985 | Erlichman et al. ...................... | 347/188 |
| 5,363,125 | 11/1994 | Inui et al. ................................ | 347/183 |
| 5,383,032 | 1/1995 | Eguchi et al. ........................... | 358/448 |
| 5,610,726 | 3/1997 | Nonoshita et al. ...................... | 358/442 |
| 5,657,071 | 8/1997 | Shinohara ................................ | 347/252 |
| 5,691,758 | 11/1997 | Kamada et al. ......................... | 347/194 |

FOREIGN PATENT DOCUMENTS

| | | |
|---|---|---|
| 0 399 668 A2 | 11/1990 | European Pat. Off. . |
| 0 527 610 A2 | 2/1993 | European Pat. Off. . |

*Primary Examiner*—N. Le
*Assistant Examiner*—Anh T. N. Vo
*Attorney, Agent, or Firm*—Sughrue, Mion, Zinn Macpeak & Seas, PLLC

[57] ABSTRACT

The improved image recording apparatus comprises an image processing section which receives image data from its external supply source and which processes the image data by image processing procedures including at least shading compensation performed on the basis of conditions for shading compensation so as to produce recording image data; an output portion for outputting the image data of an image for setting the conditions for shading compensation; an image recording section which performs image recording in response to the image data delivered from the image processing section or the output portion; a reading portion for reading the image recorded by the image recording section; and a setting portion by which the conditions for shading compensation to be used in the image processing section are set on the basis of the result of the reading by the reading portion of the image for setting the conditions for shading compensation. This image recording apparatus is capable of dealing with the time-depending variation in the state of shading in such an effective way that high-quality images can be recorded consistently over an extended period of time without experiencing any deterioration in image quality due to shading.

13 Claims, 3 Drawing Sheets

IMAGE RECORDING APPARATUS

BACKGROUND OF THE INVENTION

This invention relates to the art of image recording apparatus of a type that performs image recording on the basis of image data (image information) as received from its external supply source.

Scanned image recording is utilized in various applications including printers and copiers. In scanned image recording, means of recording which performs image recording in only one direction (main scanning direction) is moved relative to a recording material in an auxiliary scanning direction which is perpendicular to the main scanning direction, whereby an image is recorded two-dimensionally on the recording material.

For example, thermal image recording involves the use of a thermal head having a glaze in which heat-generating elements for heating the thermal recording layer of a thermal recording material to record an image are arranged in one direction (main scanning direction) and, the thermal head and the thermal material are relatively moved in the auxiliary scanning direction perpendicular to the direction in which the glaze extends, by scanning and transporting the thermal material or the thermal head with the glaze a little pressed against the thermal material (thermal recording layer), and the respective heat-generating elements of the glaze are heated imagewise by energy application to heat the thermal recording layer of the thermal material, thereby accomplishing image reproduction.

This thermal image recording is commonly used to record images produced in diagnosis by ultrasonic scanning. This recording method eliminates the need for wet processing and offers several advantages including convenience in handling. Hence in recent years, the use of the thermal image recording system is not limited to small-scale applications such as diagnosis by ultrasonic scanning and an extension to those areas of medical diagnoses such as CT, MRI and X-ray photography where large and high-quality images are required is under review.

In scanned image recording by means of optical beams, an optical beam modulated in accordance with the image to be recorded is deflected in the main scanning direction while the light-sensitive material is transported in the auxiliary scanning direction. In scanned image recording using an LED array, the LED array and the light-sensitive material are moved relative to each other in a direction perpendicular to the direction in which the individual LEDs are arranged and, at the same time, the luminous elements (pixels) in the LED array are activated in accordance with the image to be recorded. Thus, in above both cases, the light-sensitive material is scan exposed two-dimensionally to perform image recording.

These types of scanned image recording have a common problem in that even if it is attempted to perform image recording at uniform density, individual recording apparatus have their own peculiar characteristics which cause uneven image densities in the main scanning direction. This phenomenon is commonly called "shading" and deteriorates the quality of the recorded image.

In the case of thermal image recording, the shape of the glaze on the thermal head is not uniform throughout all pixels but scatters unavoidably; therefore, even if the respective heat-generating elements are supplied with the same amount of energy, they will generate different amounts of heat, causing "shading" or unevenness in the density of the image being recorded.

In order to prevent the deterioration in image quality due to "shading", certain models of image recording apparatus are adapted to perform "shading compensation", in which the unevenness in image density due to shading is corrected. A typical procedure of shading compensation is as follows. First, image recording is performed on the basis of image data having uniform density in the main scanning direction; the densities of the recorded image are measured and with a certain pixel, say, one of a minimal density, being taken as a reference, the coefficient of shading compensation which will provide a uniform image density for all pixels is calculated for each pixel and stored in a suitable device such as a memory (this is a step of setting the conditions for shading compensation). With the conditions for shading compensation having been thusly set, shading compensation in actual image recording is performed by multiplying the image data from its supply source by the calculated coefficients of shading compensation.

However, the state of shading varies with time and as the image recording apparatus is used continuously, the initial settings of the conditions for shading compensation are no longer capable of assuring the intended results but the quality of the recorded image will deteriorate gradually. In the case of thermal image recording, the glaze (or its protective layer) deteriorates by wear in the course of image recording and, in addition, stain is deposited on the glaze, whereby the amount of heat generated in response to a given supply of energy will fluctuate over time. What is more, this fluctuation in heat generation differs from one pixel to another. As a result, the state of shading varies with time and the intended shading compensation can no longer be accomplished on the basis of the initially set conditions.

The deterioration in the quality of the recorded image due to such insufficient shading compensation is a serious problem in applications that require the recording of high-quality images. Particularly in the case of the aforementioned thermal recording apparatus for use in medical applications, the deteriorated image quality is an obstacle to the correct viewing of the image, potentially leading to an error in diagnosis.

In order to avoid these problems, the conditions for shading compensation must be updated depending on the state of deterioration in image quality and this is usually accomplished in one of the following ways: a serviceman visits the user and performs the necessary updating procedure; the user sends his apparatus to a service shop for updating; the user sends to a service shop the image he has recorded in a preliminary step of the aforementioned process of setting the conditions for shading compensation and a serviceman updates the settings of the conditions for shading compensation and records the updated conditions in a medium such as a floppy disk, which is sent back to the user who then downloads it. However, these procedures are a substantial burden on both the user and the serviceman.

SUMMARY OF THE INVENTION

The present invention has been accomplished under these circumstances and has as an object providing an image recording apparatus which is capable of dealing with the time-dependent variation in the state of shading in such an effective way that high-quality images can be recorded consistently over an extended period of time without experiencing any deterioration in image quality due to shading.

In order to achieve the above object, the invention provides an image recording apparatus comprising:

an image processing section which receives image data from its external supply source and which processes said image data by image processing procedures including at least shading compensation performed on the basis of conditions for shading compensation so as to produce recording image data;

output means for outputting the image data of an image for setting the conditions for shading compensation;

an image recording section which performs image recording in response to the image data delivered from said image processing section or said output means;

reading means for reading the image recorded by said image recording section; and setting means by which the conditions for shading compensation to be used in said image processing section are set on the basis of a result of the reading by said reading means of the image for setting the conditions for shading compensation.

Preferably, on the basis of the conditions for shading compensation as calculated from the result of the reading by said reading means of the image for setting the conditions for shading compensation, said setting means calculates and stores differences from the conditions for shading compensation initially set in the image recording apparatus and multiplies said initially set conditions for shading compensation by said differences so as to set the conditions for shading compensation.

Preferably, the conditions for shading compensation are set solely on the basis of a low-frequency component of the result of the reading by said reading means of the image for setting the conditions for shading compensation.

Preferably, images of different densities are formed as said image for setting the conditions for shading compensation and the conditions for shading compensation are set on the basis of a high-frequency and a low-frequency component, the former being extracted from the image of a lower density in the result of the reading by said reading means of the image for setting the conditions for shading compensation and the latter from the image of a higher density therein.

Preferably, the mask size for image reading by said reading means is between 200 µm and 1 mm.

Preferably, said image for setting the conditions for shading compensation is read by said reading means more than once at different positions in a direction perpendicular to the direction in which shading is to occur and the results of said repeated reading are utilized to set the conditions for shading compensation.

Preferably, said reading means comprises a light source, an imaging lens, an aperture and a sensor or, alternatively, it comprises an LED array or a laser light source and a sensor.

Preferably, said output means is further adapted to output an image for setting the conditions for density correction and the conditions for density correction to be performed in said image processing section are set on the basis of the result of reading of said image by said reading means.

Preferably, the image recording apparatus measures a image sharpness on the basis of the result of image reading by said reading means.

DETAILED DESCRIPTION OF THE INVENTION

The image recording apparatus of the invention will now be described in detail with reference to the preferred embodiments shown in the accompanying drawings.

Figure 1:
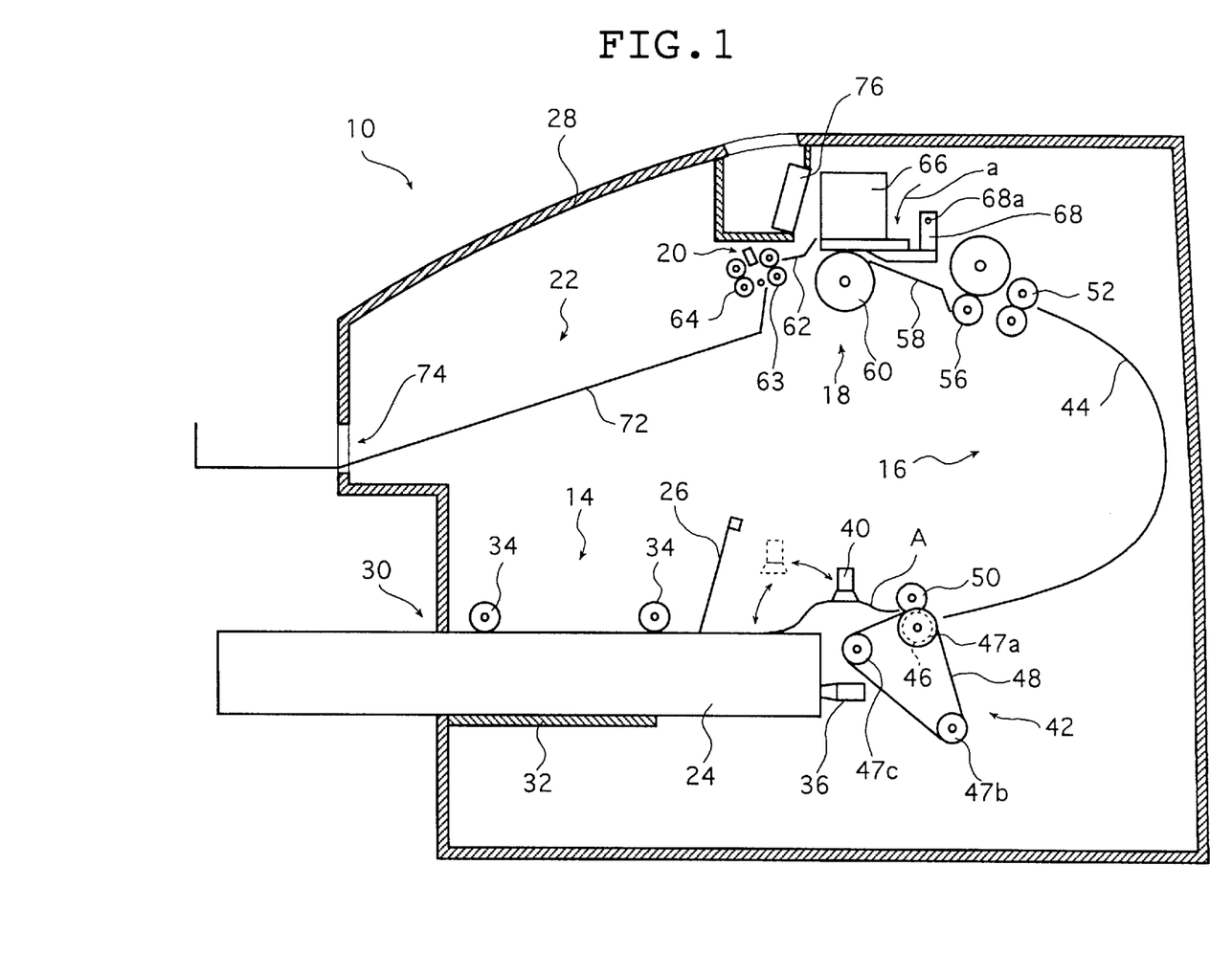
FIG. 1 is a diagram showing the concept of a case of application of the image recording apparatus of the invention to a thermal recording system.

FIG. 1 shows schematically the concept of a case of application of the image recording apparatus of the invention to a thermal recording system.

The thermal recording system generally indicated by 10 in FIG. 1 and which is hereunder simply referred to as a "recording system 10" performs thermal image recording on thermal recording materials comprising a thermal recording layer on the entire surface of a substrate such as a resin film or a paper. In the illustrated case, are used in an example thermal recording materials A (hereunder referred to as "thermal materials A") comprising a transparent film substrate made of polyethylene terephthalate (PET) which is overlaid with a thermal recording layer.

The recording system 10 comprises a loading section 14 where a magazine 24 containing thermal materials is loaded, a feed/transport section 16, an image recording section 18 performing thermal image recording on thermal materials by means of the thermal head 66 and which is hereunder referred to as a "recording section 16", an image reading section for shading compensation 20 which performs image reading for setting conditions for shading compensation and which is hereunder referred to as a "reading section 20", and an ejecting section 22.

Figure 2:
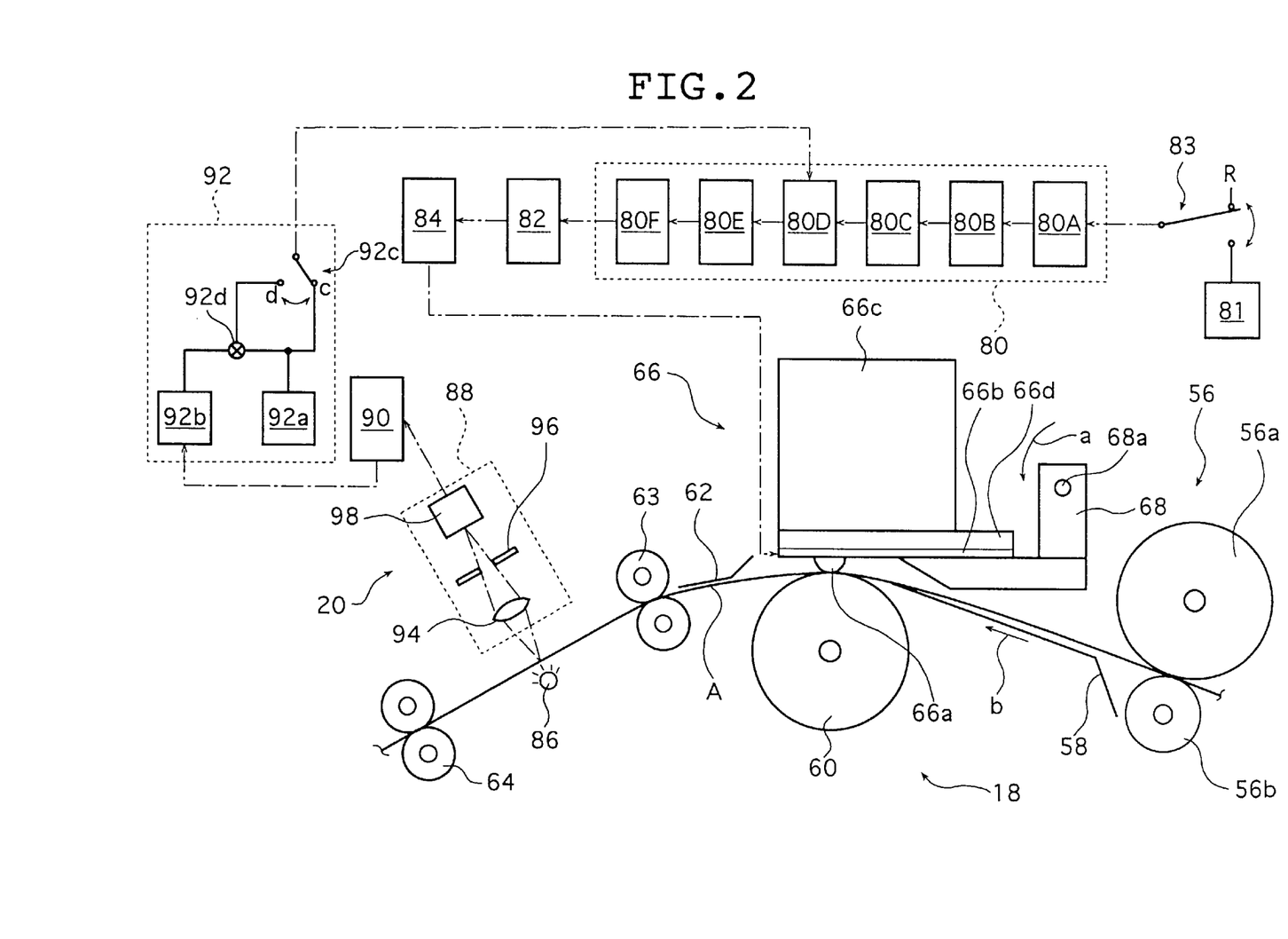
FIG. 2 shows the concept of the recording section of the thermal recording system of FIG. 1 together with a block diagram for the recording section control electronics and the reading section.

In addition, as shown in FIG. 2, the thermal head 66 in the recording section 18 is connected to an image processing unit 80, an image memory 82 and a recording control unit 84.

In the thus constructed recording system 10, the feed/transport section 16 transports the thermal material A to the recording section 18, where the thermal material A against which the thermal head 66 is pressed is transported in the auxiliary scanning direction perpendicular to the main scanning direction in which the glaze extends (normal to the papers of FIGS. 1 and 2) and in the meantime, the individual heat-generating elements are actuated imagewise to form color on the thermal material A, thereby performing thermal image recording.

The application of the image recording apparatus of the invention is in no way limited to the thermal recording system and it can advantageously be applied to other types of image recording system, such as one which performs thermal transfer of image using a peelable thermal recording material and a thermal head or a heating laser, as well as one that performs image recording by scanning exposure of a light-sensitive material with the aid of an LED array or optical beams.

In the illustrated example, thermal materials A are cut sheets of a given size, for example B4.

Typically, such thermal materials A are stacked in a specified number, say, 100 to form a bundle, which is either wrapped in a bag or bound with a band to provide a package. As shown, the specified number of thermal materials A bundled together with the thermal recording layer side facing down are accommodated in the magazine 24 of the recording system 10, and they are taken out of the magazine 24 one by one to be used for thermal image recording.

The magazine 24 is a case having a cover 26 which can be freely opened. The magazine 24 which contains the thermal materials A is loaded in the loading section 14 of the recording system 10.

The loading section 14 has an inlet 30 formed in the housing 28 of the recording system 10, a guide plate 32, guide rolls 34 and a stop member 36; the magazine 24 is inserted into the recording system 10 via the inlet 30 in such a way that the portion fitted with the cover 26 is coming first; thereafter, the magazine 24 as it is guided by the guide plate 32 and the guide rolls 34 is pushed until it contacts the stop member 36, whereupon it is loaded at a specified position in the recording system 10.

The feed/transport section 16 has the sheet feeding mechanism using the sucker 40 for grabbing the thermal material A by application of suction, transport means 42, a transport guide 44 and a regulating roller pair 52 located in the outlet of the transport guide 44; the thermal materials A are taken out of the magazine 24 in the loading section 14 and transported to the recording section 18.

The transport means 42 is composed of a transport roller 46, a pulley 47a coaxial with the roller 46, a pulley 47b coupled to a rotating drive source, a tension pulley 47c, an endless belt 48 stretched between the three pulleys 47a, 47b and 47c, and a nip roller 50 that is to be pressed onto the transport roller 46. The forward end of the thermal material A which has been sheet-fed by means of the sucker 40 is pinched between the transport roller 46 and the nip roller 50 such that the material A is transported.

When a signal for the start of recording is issued, the cover 26 is opened by the OPEN/CLOSE mechanism (not shown) in the recording system 10. Then, the sheet feeding mechanism using the sucker 40 picks up one sheet of thermal material A from the magazine 24 and feeds the forward end of the sheet to the transport means 42 (to the nip between rollers 46 and 50). At the point of time when the thermal material A has been pinched between the transport roller 46 and the nip roller 50, the sucker 40 releases the material, and the thus fed thermal material A is supplied by the transport means 42 into the regulating roller pair 52 as it is guided by the transport guide 44.

At the point of time when the'thermal material A to be used in recording has been completely ejected from the magazine 24, the OPEN/CLOSE mechanism closes the cover 26.

The distance between the transport means 42 and the regulating roller pair 52 which is defined by the transport guide 44 is set to be somewhat shorter than the length of the thermal material A in the direction of its transport. The advancing end of the thermal material A first reaches the regulating roller pair 52 by the transport means 42. The regulating roller pair 52 are normally at rest. The advancing end of the thermal material A stops here and is subjected to positioning.

When the advancing end of the thermal material A reaches the regulating roller pair 52, the temperature of the thermal head 66 (glaze 66a) is checked and if it is at a specified level, the regulating roller pair 52 start to transport the thermal material A, which is transported to the recording section 18.

FIG. 2 shows schematically the recording section 18 and the reading section 20.

The recording section 18 has the thermal head 66, a platen roller 60, a cleaning roller pair 56, a guide 58, a fan 76 for cooling the thermal head 66 (see FIG. 1) and a guide 62, as well as the image processing unit 80, the image memory 82, the recording control unit 84 and a pattern generating portion 81 constituting a recording control system.

The thermal head 66 is capable of thermal image recording at a recording (pixel) density of, say, about 300 dpi on thermal films for example up to a maximum of B4 size. The head comprises a body 66b having the glaze 66a in which the heat-generating elements performing thermal recording on the thermal material A are arranged in one direction, that is in the main scanning direction (perpendicular to the papers of FIGS. 1, 2), and a heat sink 66c fixed to the body 66b. The thermal head 66 is supported on a support member 68 that can pivot about a fulcrum 68a either in the direction of arrow a or in the reverse direction.

The platen roller 60 rotates at a specified image recording speed while holding the thermal material A in a specified position, and transports the thermal material A in the auxiliary scanning direction perpendicular to the main scanning direction (direction of arrow b in FIG. 2).

The cleaning roller pair 56 consists of an adhesive rubber roller 56a made of an elastic material and a non-adhesive roller 56b. The adhesive rubber roller 56a picks up dirt and other foreign matter that has been deposited on the thermal recording layer in the thermal material A, thereby preventing the dirt from being deposited on the glaze 66a or otherwise adversely affecting the image recording operation.

Before the thermal material A is transported to the recording section 18, the support member 68 in the illustrated recording system 10 has pivoted to UP position (in the direction opposite to the direction of arrow a) so that the thermal head 66 (or glaze 66a) is not in contact with the platen roller 60.

When the transport of the thermal material A by the regulating roller pair 52 starts, said material is subsequently pinched between the cleaning rollers 56 and transported as it is guided by the guide 58. When the advancing end of the thermal material A has reached the record START position (i.e., corresponding to the glaze 66a), the support member 68 pivots in the direction of arrow a and the thermal material A becomes pinched between the glaze 66a on the thermal head 66 and the platen roller 60 such that the glaze 66a is pressed onto the recording layer while the thermal material A is transported in the direction indicated by arrow b by means of the platen roller 60 (as well as the regulating roller pair 52 and the transport roller pair 63) as it is held in a specified position.

During this transport, the individual heat-generating elements on the glaze 66a are actuated imagewise to perform thermal image recording on the thermal material A.

As described above, the system for controlling the recording with the thermal head 66 comprises essentially the image processing unit 80, the image memory 82, the recording control unit 84, the pattern generating portion 81, and a switch 83 for change over of the connection between the image processing unit 80 and an image data supply source R or the pattern generating portion 81.

Image data (image information) from an image data supply source R such as CT or MRI is sent to the image processing unit 80, which is the combination of various kinds of image processing circuits and memories. That is, in normal state, the switch 83 connects the image data supply source R to the image processing unit 80.

The image data supplied from the image data supply source R is first sent to a processing portion (not shown) for the necessary formatting (scaling and frame assignment);

thereafter, the image data is sent to a sharpness correcting portion 80A, where it is subjected to sharpness correction for enhancing the edges of an image; then, the image data is sent to a tone correcting portion 80B, where it is not only subjected to tone correction for producing an appropriate image in compliance with associated parameters such as the gamma value of the thermal material A but also transformed to image data that complies with the drive of the thermal head 66 by the recording control unit 84; then, the image data is sent to a temperature compensating portion 80C, where it is subjected to temperature compensation for adjusting the heat generating energy in accordance with the temperatures of heat-generating elements; then, the image data is sent to a shading compensating portion 80D, where it is subjected to the aforementioned process of shading compensation; then, the image data is sent to a resistance correcting portion 80E, where it is subjected to resistance correction for correcting the differences between the resistances of adjacent heat-generating elements; finally, the image data is sent to a black ratio correcting portion 80F, where it is subjected to black ratio correction such that image data representing the same density will produce a color of identical density irrespective of the changes in the resistances of heat-generating elements due to heating. Having been subjected to these steps of correction, the image data is delivered to the image memory 82 as an output image data for use in thermal recording by the thermal head 66.

In the case under consideration, the shading compensating portion 80D also serves as means of setting the conditions for shading compensation.

The recording control unit 84 reads the stored image data sequentially out of the image memory 82 line by line in the main scanning direction. The control unit 84 then supplies the thermal head 66 with image signals modulated in accordance with the thusly read thermal recording image data (the duration of time for which voltage is applied imagewise) on the basis of the signal for heat generation which is a reference clock for heat generation.

The individual image recording dots on the thermal head 66 generate heat in accordance with the received image signals and, as already described above, thermal recording is performed on the thermal material A as it is transported in the direction of arrow b by such means of transport as the platen roller 60.

After the end of thermal recording, the thermal material A as it is guided by the guide 62 is transported by the platen roller 60 and the transport roller pairs 63, 64 to be ejected into a tray 72 in the ejecting section 22. The tray 72 projects exterior to the recording system 10 via the outlet 74 formed in the housing 28 and the thermal material A carrying the recorded image is ejected via the outlet 74 for takeout by the operator.

As shown in FIG. 1, the (thermal) recording system 10 incorporating the image recording apparatus of the invention has a reading section 20 provided between the downstream transport roller pairs 63 and 64 in the recording section 18 (in order to read an image for shading compensation).

As already mentioned, it is difficult to ensure that the shape of the glaze 66a on the thermal head 66 is uniform throughout all pixels and a certain amount of scattering usually occurs from one pixel to another. In addition, the amount of heat generated by the heat-generating elements is variable in the direction in which the glaze 66a extends. Therefore, even if thermal recording is performed using image data which represent the same density, shading, or uneven densities, occur on account of such scattering in the shape of the glaze or the positional variation.

The recording system 10 corrects such unevenness in density by performing shading compensation in the shading compensating portion 80D.

Shading compensation is typically performed in the following way: first, energy for image data of a specified density is supplied to all pixels (heat-generating elements) of the thermal head 66 to form an image by actual thermal recording and the density of the recorded image is measured by a suitable means such as a densitometer; then, with a certain pixel, say, one of a minimal density, being taken as a reference, a coefficient of correction that will provide a uniform density for the thermally recorded image throughout all pixels is calculated for each pixel and the conditions for shading compensation are set and stored in the shading compensating portion 80D and shading compensation is performed in the actual process of thermal recording by multiplying the image data by the calculated coefficients of correction.

In practice, however, the state of shading varies with time due, for example, to the deterioration by wear of the glaze 66a or stain deposition on it and as the recording system 10 is used continuously, it becomes difficult to accomplish the intended shading compensation on the basis of the initially set conditions for correction and the quality of the image being recorded will gradually deteriorate as already mentioned in connection with the prior art.

In the recording system 10 of the invention, the pattern generating portion 81 outputs image data in association with an image (i.e., a chart) for setting the conditions for shading compensation (such conditions are hereunder referred to simply as "conditions for correction") and the chart is recorded on the thermal material A by means of the thermal head 66; the recorded chart is read by means of the reading section 20 to provide the image data of the chart, which is utilized in the shading compensating portion 80D to update (modify) the conditions for correction, whereby the intended shading compensation can be performed independently of the passage of time to ensure that images of high quality are thermally recorded in a consistent manner over an extended period of time.

The pattern generating portion 81 is typically a memory which stores image data such as those of the chart for setting the conditions for correction or it is a processing circuit which generates such image data.

When the recording system 10 has performed thermal recording to produce a specified number of prints (say, 1,000–10,000 prints or so) or when it is supplied with a user instruction to update the conditions for correction, the switch 83 changes its position to establish a connection between the pattern generating portion 81 and the image processing unit 80, whereupon the pattern generating portion 81 outputs image data of the chart for setting the conditions for correction and, in response to this output image data, the image processing unit 80 processes it by a specified procedure and delivers it to the memory 82 as image data of the chart.

The image data of the chart may be of the same type as obtained when setting the conditions for (shading) correction in the conventional manner; typically, it may be such image data that those having the same density throughout all pixels in the main scanning direction are recorded in the auxiliary scanning direction by a sufficient length for image recording (to incorporate the image data for setting the conditions for correction).

The density of the chart is also not limited to any particular value.

In the case under discussion, the unevenness in density due to shading is such that the lighter image has a marked degree of unevenness in the high-frequency component of density whereas the darker image has a noticeable degree of unevenness in the low-frequency component of density. Under these circumstances, the density of the chart may be determined as appropriate for a certain parameter such as the object of use of the image to be finally formed.

Alternatively, if the image data for updating the conditions for correction can be incorporated in high density, two charts may be formed, one reproducing the lighter image and the other reproducing the darker image, and information on the high-frequency component is extracted from the lighter chart and information on the low-frequency component from the darker chart and the conditions for correction are set on the basis of the two kinds of information. This is another preferred method to be employed in the invention.

As in the aforementioned image recording process, the output image data of the chart is read from the image memory 82 by means of the recording control unit 84 and the chart is recorded on the thermal head A by means of the thermal head 66. In the illustrated recording system 10, the recorded image of the chart is read by means of the reading section 20 provided between the transport roller pairs 63 and 64. The reading section 20 comprises reading means including a light source 86 and a reading unit 88, as well as an A/D converter 90 and a memory 92.

Figure 3:
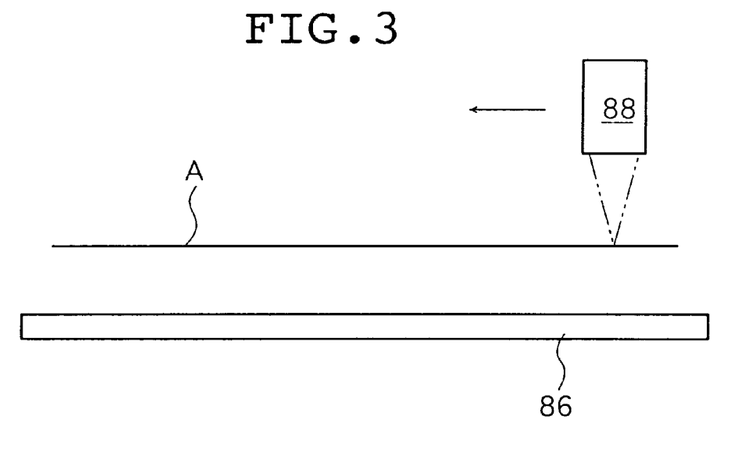
FIG. 3 is a diagram showing the concept of the reading means in the thermal recording system of FIG. 1.

As FIG. 3 shows, the light source 86 is typically a rod-shaped fluorescent lamp or halogen lamp which extends in the main scanning direction by a sufficient length to cover the glaze 66a (extending across the thermal material A in the main scanning direction).

The reading unit 88 is composed of a condenser lens 94, an aperture 96 and a sensor 98 and it is positioned on the side of the transport path of the thermal material A which is away from the light source 86. When the chart recorded on the thermal material A has been transported to the position where it is to be read by means of the reading unit 88, the light from the source 86 which has passed through the thermal material A (chart) is collected by the condenser lens 94, regulated by the aperture 96 and read photoelectrically by the sensor 98. Moving means (not shown) causes the reading unit 88 to be moved at a specified speed in the main scanning direction as it is kept to face the light source 86 (see FIG. 3), such that said reading unit 88 reads the chart over the entire range in the main scanning direction.

The transport of the chart to the position where it is to be read by the reading unit 88 may be detected by sensing a variation in the output of the sensor 98 or the amount of transport of the thermal material A by means of platen roller 60 or some other suitable parameter.

The size of the opening of the aperture 96 (i.e., the reading mask size) is not limited to any particular value and may be determined as appropriate for the resolution to be achieved, the frequency of an unevenness component that is to be generated by shading or some other parameter; typically, an aperture size of from about 200 μm to about 1 mm is preferred.

The method of moving the reading unit 88 also is not limited in any particular way and various known methods of transmission may be employed, as exemplified by screw driving, wrapping connector driving such as belt driving using endless belt and pulleys and chain driving using chain and sprockets and gear driving such as a rack-and-pinion mechanism.

The thermal material A may be kept transported or at rest while the chart is read by means of the reading unit 88.

If desired, the chart may be read more than once at different positions in the auxiliary scanning direction which is perpendicular to the direction in which shading is to occur. By so doing, any abnormal data that will cause greatly differing densities can be rejected or improved precision can be realized due to averaging when setting the conditions for correction and preferred results are obtained. The thermal material A may be kept transported during the repeated reading operation. Alternatively, the transport of the thermal material A may be intermittent such that after reading of the chart, the thermal material A is transported by a slight distance and the chart is read again at a different position in the auxiliary scanning direction, with the same process being repeated a specified number of times. In this alternative case, the reading process may be unidirectional or reciprocal.

In the illustrated case, the reading means includes the elongated light source 86 and the reading unit 88 which is composed of the condenser lens 94, aperture 96 and sensor 98. This is not the sole example of the reading means that can be employed in the invention and the light source 86 may be replaced by an LED array or a laser light source whereas the reading unit 88 may be replaced by one having neither lens nor aperture. Alternatively, a point light source and the reading unit 88 may be moved in synchronism with each other to read the chart; in yet another embodiment, a line sensor may be combined with a fixed reading unit so as to read the chart.

The image data of the chart read by the sensor 98 in the reading unit 88 is A/D converted by the A/D converter 90 and stored in the memory 92.

The shading compensating portion 80D of the image processing unit 80 utilizes the image data stored in the memory 92 to update (modify) the conditions for correction, namely, to calculate the coefficients of shading compensation in association with the respective pixels; the subsequent events of shading compensation are accomplished on the basis of the updated conditions for correction.

The new conditions for correction may be set by various known techniques solely on the basis of the image data of the chart read by means of the reading unit 88.

It should, however, be noted that the conditions for correction initially set in the recording system 10 are based on image data of an extremely high precision and density that have been obtained by measurements in a manufacturing shop. In contrast, considering the manufacturing cost and the size of the recording system 10, the image data measured within the system are inevitably of poor quality in terms of both precision and density as compared with the data measured in the manufacturing shop. Therefore, if the conditions for correction are set solely on the basis of the image data of the chart that has been read by means of the reading unit 88, the image quality may be deteriorated rather than maintained at high level.

To deal with this difficulty, the illustrated recording system 10 is adapted to be such that the conditions for correction initially set in the system 10 (which are hereunder referred to as the "initial conditions for correction") and a difference from them are stored in the memory 92 and the shading compensating portion 80D multiplies the initial conditions for correction by said difference to thereby provide updated conditions for correction.

As FIG. 2 shows, the memory 92 comprises a first memory 92a, a second memory 92b, a switch 92c and a multiplier 92d. The first memory 92a stores the initial conditions for correction, and the second memory 92b stores the differences from the initial conditions for correction stored in the memory 92a.

To update the conditions for correction, the shading compensating portion 80D first changes the position of switch 92c to c and reads the initial conditions for correction from the first memory 92a, and the chart is recorded. The recorded chart is read by means of the reading unit 88 and its image data (or the conditions for correction that are set on the basis of that data) are stored as differential data in the second memory 92b (i.e., the conditions for correction are updated).

To perform thermal recording, the shading compensating portion 80D changes the position of switch 92c to d and reads the initial conditions for correction from the first memory 92a and the differential data from the second memory 92b. The two readouts are subjected to a multiplication in the multiplier 92d to provide a new coefficient of shading compensation (or, alternatively, new conditions for correction are calculated from the multiplied data); the shading compensating portion 80D utilizes either the new coefficient of shading compensation or the new conditions for correction to perform the intended shading compensation.

As already mentioned, the reading unit 88 connected to the recording system 10 is incapable of reading image data of a very high precision and density on account of reasons of cost and system size. Under the circumstances, it is preferred that only image data of the low-frequency component are read by means of the reading unit 88 and averaged or subjected to linear interpolation or processed by some other suitable techniques for producing image data associated with the individual pixels.

In addition to the setting of the conditions for shading compensation, the recording system 10 of the invention may be adapted-to perform calibration (i.e., the setting of the conditions for density correction) with the aid of the reading unit 88 and the image processing unit 80.

To perform such calibration, the image data of a chart which has image patterns of differing densities formed on it for setting the conditions for density correction are stored in (or rendered to be capable of generation from) the pattern generating portion 81; when thermal recording has been performed to produce a specified number of prints or when a user instruction is issued to update the conditions for density correction, the pattern generating portion 81 outputs the image data of the chart for setting the conditions for density correction and after being processed by a specified procedure by the image processing unit 80, the output image data is delivered by the image processing unit 80, the output image data is delivered to the memory 82; subsequently, as in the aforementioned case of shading compensation, the chart for density correction is recorded on the thermal material A.

The recorded chart is read by means of the reading unit 88 and, as in the case of shading compensation, the chart is subjected to A/D conversion; thereafter, the converted chart is stored in the memory 92 as image data for setting the conditions for density correction and the tone correcting portion 80B utilizes the stored image data to update the conditions for density correction. In the subsequent stage, the tone correcting portion 80B utilizes the updated conditions for density correction in order to accomplish transformation to image data in compliance with the intended thermal recording thereof.

The conditions for density correction may be set by any known methods such as constructing a transformation curve (or table) on the basis of a transformation algorithm.

In yet another embodiment of the recording system 10, the opening of the aperture 96 in the reading unit 88 may be reduced to a sufficiently small diameter that a thermally recorded image is read by means of the reading unit 88 such as to enable the measurement of the image sharpness.

In the foregoing description, the recording system 10 contains in its interior the reading section 20 which comprises the reading means consisting of the light source 86 and the reading unit 88, as well as the A/D converter 90 and the memory 92. However, this is not the sole case of the invention and the recording system 10 may have the reading section positioned exterior to it as shown in FIG. 4.

Figure 4:
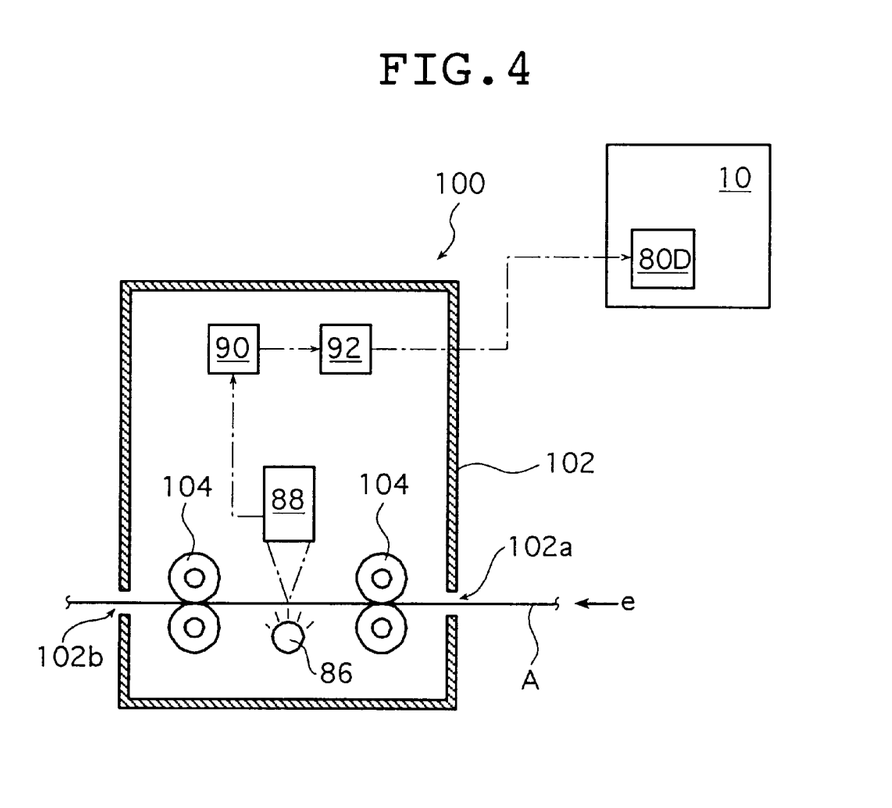
FIG. 4 is a diagram showing the concept of another case of application of the image recording apparatus of the invention to a thermal recording system.

The reading section generally indicated by 100 in FIG. 4 is essentially the same as the reading section 20 in various aspects such as the composition of the reading unit 88; therefore, the same components are identified by like numerals and the following description is directed mainly to the different elements.

The reading section 100 comprises a housing 102 which contains two roller pairs 104 which transport the thermal material A in the direction of arrow e; the light source 86 is positioned between the two transport rollers and the reading unit 88 is positioned on the side of the transport path of the thermal material A which is away from the light source 86; the reading unit 88 is connected to the A/D converter 90 and the memory 92 which, in turn, is connected to the shading compensating portion 80D of the recording system 10 such that the reading section 100 becomes an integral part of the latter.

As in the case shown in FIG. 2, the reading unit 88 is so adapted that it is movable by moving means (not shown) in a direction perpendicular to the direction in which the thermal material A is transported by the roller pairs 104.

The housing 102 also has two openings 102a and 102b in positions in registry with the transport path defined by the roller pairs 104; the thermal material A is fed into the housing 102 through the opening 102a and ejected through the opening 102b.

The operation of the system shown in FIG. 4 is essentially the same as the foregoing case. When a specified number of prints have been produced by thermal recording or when a user instruction is issued to update the conditions for shading compensation, the pattern generating portion 81 supplies the image processing unit 80 with the image data of the chart for setting the conditions for shading compensation and the output image data is stored in the memory 82. As in the foregoing case, the chart is recorded on the thermal material A, which is thereafter ejected onto the tray 72.

Subsequently, the thermal material A which has the chart for shading compensation recorded thereon is picked up from the tray 72 by the operator and inserted into the housing 102 through the inlet 102a in such a way that the main scanning direction of the thermal material A coincides with the direction in which the reading unit 88 moves.

The subsequent steps of reading the chart and setting the conditions for correction are basically the same as in the foregoing case; the insertion of the thermal material A into the housing 102 is detected by a suitable means such as a sensor (not shown) and the roller pairs 104 start to rotate to transport the thermal material A; when the areas of the thermal material A in which the chart was recorded has reached the position in which it is to be read by means of the reading unit 88, the latter begins to move, thereby reading the chart with the thermal material A being at rest or transported continuously. The image data of the read chart is A/D converted in the A/D converter 90 and stored in the memory 92; the shading compensating portion 80D utilizes the stored image data to update the conditions for correction.

On the foregoing pages, the image recording apparatus of the invention has been described in detail but the present invention is in no way limited to the stated embodiments and various improvements and modifications can of course be made without departing from the spirit and scope of the invention.

The image recording apparatus of the illustrated case records an image on a transparent thermal material A (thermal film) and reads the transmitted light such as to set the conditions for shading compensation. If the recording material is not transparent, the conditions for shading compensation may be set by reading the reflected light from the chart as in the case of reading an image on ordinary reflection originals.

As described above in detail, the image recording apparatus of the invention is capable of dealing with the time-dependent variation in the state of shading in such an effective way that high-quality images can be recorded consistently over an extended period of time without experiencing any deterioration in image quality due to shading.

What is claimed is:

1. An image recording apparatus comprising:

an image processing section that receives first image data from an external source during a normal mode and receives second image data during an adjustment mode, wherein said image processing section performs at least shading compensation processing of the first image data based on conditions of shading compensation, so as to produce recording image data;

means for outputting said second image data, wherein said second image data is associated with a chart for setting said conditions of shading compensation;

an image recording section that generates a normal recorded image in response to the recording image data during said normal mode and generates an adjustment recorded image based on the second image data during said adjustment mode; and means for reading said adjustment recorded image recorded by said image recording section to provide read data;

wherein said image processing section includes means for setting the conditions of shading compensation based on said read data.

2. The image recording apparatus according to claim 1, wherein said means for setting stores differences between said conditions of shading compensation settings and predetermined conditions of shading compensation which were initially set in the image recording apparatus, and wherein said means for setting multiplies said predetermined conditions of shading compensation which were initially set in the image recording apparatus by said differences so as to provide updated conditions of shading compensation.

3. The image recording apparatus according to claim 1, wherein the conditions of shading compensation are set solely based on a low-frequency component of density of said adjustment recorded image.

4. The image recording apparatus according to claim 1, wherein said chart comprises images having different respective densities; and wherein the conditions of shading compensation are set based on a high-frequency component of density and on a low-frequency component of density, the high-frequency component of density being extracted from a lower density portion of said chart by said means for reading, and the low-frequency component of density being extracted from a higher density portion of said chart.

5. The image recording apparatus according to claim 1, wherein said means for reading has a mask which is dimensioned between 200 $\mu$m and 1 mm.

6. The image recording apparatus according to claim 1, wherein said adjustment recorded image is read by said means for reading at different positions in a direction perpendicular to a direction in which shading is to occur; and wherein said readings are utilized to set the conditions of shading compensation.

7. The image recording apparatus according to claim 1, wherein said means for reading comprises a light source, an imaging lens, and aperture, and a sensor.

8. The image recording apparatus according to claim 1, wherein said means for outputting outputs said second image data for setting conditions of density corrections, and wherein the conditions of density correction are processed in said image processing section based on results of said reading by said means for reading.

9. The image recording apparatus according to claim 1, wherein a sharpness of an image is measured based on results of said reading by said means for reading.

10. The image recording apparatus according to claim 1, wherein said means for reading comprises an LED and a sensor.

11. The image recording apparatus according to claim 1, wherein said means for reading comprises a laser light source and a sensor.

12. An image recording apparatus comprising:

an image processing section that receives first image data from an external source during a normal mode and receives second image data during an adjustment mode, wherein said image processing section performs digital shading compensation processing of the first image data based on conditions of shading compensation, so as to produce recording image data;

means for outputting said second image data, wherein said second image data is associated with a chart for setting said conditions of shading compensation;

an image recording section that generates a normal recorded image in response to the recording image data during said normal mode and generates an adjustment recorded image based on the second image data during said adjustment mode; and means for reading said adjustment recorded image recorded by said image recording section to provide read data; and wherein said image processing section includes means for setting the conditions of shading compensation based on said read data.

13. An image recording apparatus comprising:

an image processing section that receives first image data from an external source during a normal mode and receives second image data during an adjustment mode, wherein said image processing section performs at least shading compensation processing of the first image data based on conditions of shading compensation, so as to produce recording image data;

means for outputting said second image data, wherein said second image data is associated with a chart for setting said conditions of shading compensation;

an image recording section that generates a normal recorded image in response to the recording image data during said normal mode and generates an adjustment recorded image based on the second image data during said adjustment mode; and means for reading said adjustment recorded image recorded by said image recording section to provide read data; and wherein said image processing section includes means for setting the conditions of shading compensation based on said read data, and wherein said conditions of shading compensation are set by said means for setting prior to image recording of said normal image by said image recording section during said normal mode.

* * * * *